Jan. 8, 1929.  
R. SARDESON ET AL  
1,698,453  
ENGINE MOUNTING FOR AUTOMOTIVE VEHICLES  
Filed Aug. 3, 1925
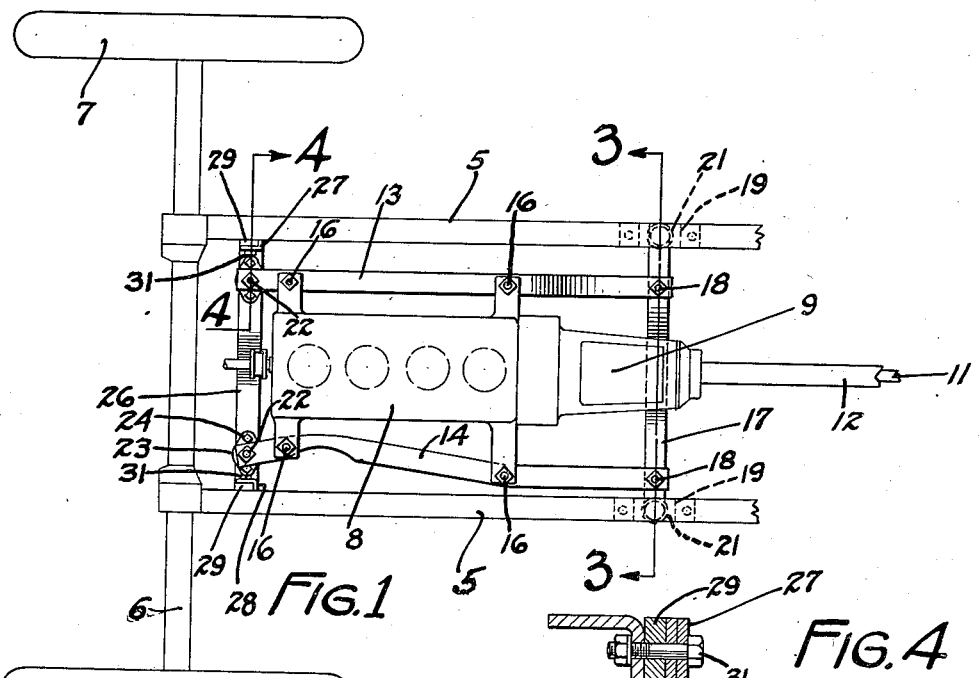
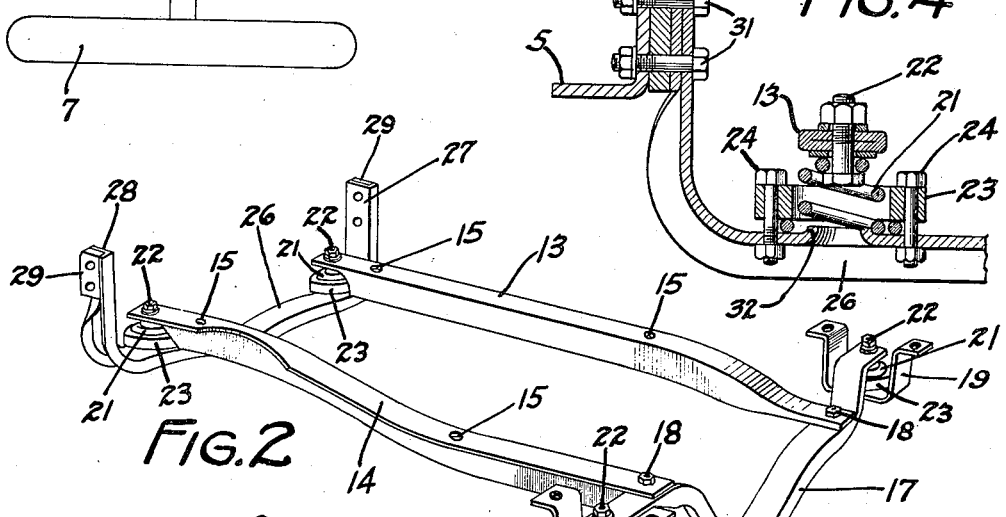
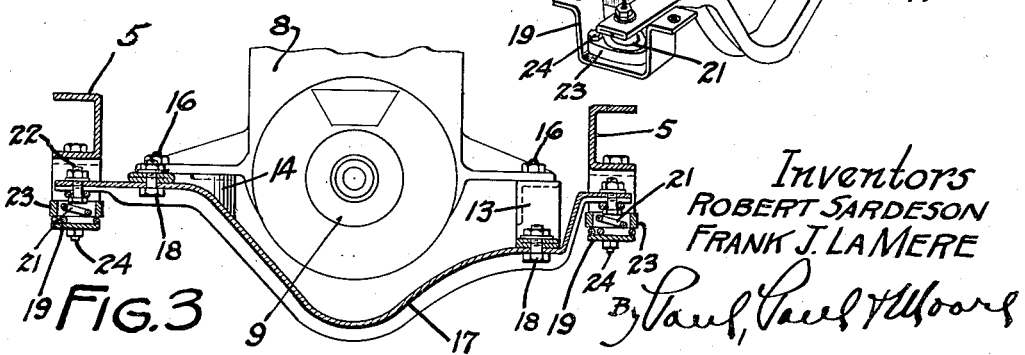
Inventors  
ROBERT SARDESON  
FRANK J. LA MERE
ATTORNEYS Patented Jan. 8, 1929.

1,698,453

UNITED STATES PATENT OFFICE.

ROBERT SARDESON AND FRANK J. LA MERE, OF MINNEAPOLIS, MINNESOTA, ASSIGNORS TO SARDESON & LA MERE PATENTS HOLDING COMPANY, LTD., OF MINNEAPOLIS, MINNESOTA, A PARTNERSHIP COMPOSED OF J. D. STRUTZEL, FRANK J. LA MERE, ROBERT SARDESON, JOHN CORSER, AND MARTINSON BROTHERS & OSBORN, INC.

ENGINE MOUNTING FOR AUTOMOTIVE VEHICLES.

Application filed August 3, 1925. Serial No. 47,886.

This invention relates to new and useful improvements in engine mountings for automotive vehicles, and more particularly relates to a means for resiliently mounting the engine on the chassis frame in such a manner that all vibrations of the engine will be absorbed or taken up thereby and will not be transmitted to the chassis frame.

A feature of the invention is to provide a supplementary frame adapted to be connected to the usual frame of the automobile and upon which the engine is mounted, said frame being provided with resilient means for absorbing engine vibration thereby preventing such vibration from being transmitted to the chassis frame.

The particular object of the invention, therefore, is to provide a resilient engine mounting for automotive vehicles, which is an improvement over the form shown in our prior pending application filed January 12th, 1925, Serial No. 1905.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a plan view of a portion of an automobile chassis frame showing the novel engine mounting secured thereto;

Figure 2 is a perspective view of the supplementary frame showing the means provided thereon for absorbing engine vibrations;

Figure 3 is a cross-sectional view on the line 3—3 of Figure 1; and

Figure 4 is an enlarged detail sectional view on the line 4—4 of Figure 1.

In the selected embodiment of the invention here shown, for purposes of disclosure, there is illustrated an automobile chassis frame of ordinary construction, comprising the side frames 5, front axle 6, wheels 7 and the usual engine 8, having the transmission case 9 mounted adjacent thereto and to which the propellor or drive shaft 11 and supporting tube 12 are connected.

The novel engine supporting means or mounting featured in this invention differs from that shown in the above mentioned pending application in that a supplementary frame is provided to support the engine. This frame is provided with means for absorbing and taking up engine vibration and is adapted to be mounted upon and secured to the chassis frame of the automobile.

The supplementary frame comprises a pair of side rails 13 and 14, preferably of angle bar, upon which the engine 8 is mounted and secured as shown in Figure 1. The rails 13 and 14 are provided with apertures 15 to receive bolts 16 which securely bolt the engine thereto. The rails 13 and 14 may be arranged in parallel relation or if desired one or both of the rails may be shaped as shown in the lower portion of Figure 1, wherein it will be noted that the rail 14 is not straight, but has been slightly curved or bent in order to provide clearance for parts of the automobile mechanism such, for instance, as the usual steering post of the automobile. The rear end-portions of the side rails 13 and 14 are preferably flattened and are bolted to a cross member 17, which has its central portion curved downwardly to provide clearance for the transmission case 9 as shown in Figure 3. Bolts 18 secure the side rails to the cross member 17. The ends of the cross member 17, which preferably is of channel bar, are similarly flattened and are resiliently connected to hangers 19 adapted to be secured to the side frames 5 and 6 of the chassis frame, as shown in Figures 1 and 3.

The means provided for resiliently connecting the end-portions of the cross member 17 to the hangers or stirrups 19, preferably consists of a pair of spirally wound compression springs 21, which are interposed between the lower faces of the end-portions of the cross member 17 and the lower horizontal portions of the stirrups 19, as particularly shown in Figure 3. Bolts 22 secure the upper ends of the springs to the cross member 17 while the lower ends thereof, which are relatively larger in diameter, are securely clamped to the stirrups 19 by means of clamps 23 secured thereto by means of bolts 24. By thus securing the cross member 17 to the stirrups 19 the springs 21, in addition to functioning as a means for absorbing vibration, also provide a definite means for locating the engine with respect to the chassis frame of the automobile.

The forward ends of the side rails 13 and 14 of the supplementary frame are similarly supported by means of a U-shaped cross member 26 having its upright end-portions 27 and 28 adapted to be secured to the side beams 5 and 5 of the chassis frame as shown in Figures 1 and 4. Filler blocks 29 are preferably interposed between the end-portions 27 and 28 and the side beams 5 and 5 in order that the ends 27 and 28 may be securely fastened to the beams by such means as the bolts 31. Coiled compression springs 21 are similarly provided between the forward end-portions of the side rails 13 and 14 and the upper faces of the U-shaped cross member 26, so that the forward end-portions of the rails 13 and 14 will likewise be resiliently mounted upon the U-shaped member 26. Portions of the metal of the horizontal web of the U-shaped member 26 are preferably up-turned, as shown in Figure 4, to provide annular flanges 32 which function to provide seats for the lower ends of the springs 21. The lower ends of the springs are similarly clamped to the cross member 26 by means of clamping rings 23, while the upper ends thereof are secured to the rails 13 and 14 by the bolts 22.

By the employment of this novel engine mounting in conjunction with automobile frames, of ordinary construction, the engine and associated parts will be resiliently connected to the chassis frame in such a manner that all objectionable vibration will be substantially eliminated, thereby considerably improving the riding qualities of the automobile as well as preventing excessive wear of the engine and associated parts, as a result of violent vibration which is particularly noticeable when operating automobiles, especially of the four-cylinder type, at certain speeds.

This improved mounting, therefore, is of particular value when used in connection with four-cylinder engines, although it may be used with improved results in connection with engines employing six or eight cylinders. The four springs 21 upon which the weight of the engine is supported may be constructed so as to have equally resilient characteristics, or if desired the two springs at the rear of the supplementary frame may be constructed so as to be relatively stronger or stiffer than the forward supporting springs to provide for the additional weight of the transmission case 9 and drive shaft. Means may also be provided for connecting the rear end of the transmission case 9 to the lower depressed central portion of the cross member 17, but in actual operation it has been found unnecessary to provide such a support. By the use of this resilient mounting a sudden jolt or jar transmitted to the chassis frame from the wheels contacting with obstructions in the roadway will be absorbed by the springs 21, thereby preventing such jolts from being transmitted to the engine and its associated parts. The construction of the supplementary frame is very simple and inexpensive, and the means provided for connecting it to the automobile frame is such that it may readily and conveniently be connected thereto in a minimum amount of time. It has also been found in actual operation that the supplementary frame, in addition to providing a resilient mounting for the engine, also tends to materially strengthen the chassis frame.

Having thus described our invention what we claim as new and desire to secure by Letters-Patent, is:

1. In combination with a chassis, a pair of cross members and a pair of side rails arranged upon said cross members, springs connecting each rail to one of the cross members, springs connecting the other cross member to the chassis, the connections being such as to permit universal movement of the cross members and rails with respect to the chassis, and said springs being of conical spiral form with their apices at a higher level than their bases.

2. In combination with a chassis, a pair of cross members and a pair of side rails arranged upon said cross members, springs connecting each rail to one of the cross members, springs connecting the other cross member to the chassis, the connections being such as to permit universal movement of the cross members and rails with respect to the chassis, and said springs being of conical spiral form with their apices at a higher level than their bases, the arrangement further being such that movement in an upward direction is limited only by the resiliency of the springs.

3. In combination with a chassis, a pair of cross members and a pair of side rails arranged upon said cross members, springs connecting each rail to one of the cross members, springs connecting the other cross member to the chassis, the connections being such as to permit universal movement of the cross members and rails with respect to the chassis, and said springs being of conical spiral form with their apices at a higher level than their bases, and with the apices attached in one instance directly to the rails and in the other instance directly to one of the cross members.

In witness whereof, we have hereunto set our hands this 24th day of July, 1925.

ROBERT SARDESON.
FRANK J. LA MERE.